United States Patent [19]

Endo et al.

[11] Patent Number: 4,602,047
[45] Date of Patent: Jul. 22, 1986

[54] PROCESS FOR PRODUCING FOAMED PARTICLES OF POLYOLEFIN RESIN

[75] Inventors: Hiroshi Endo; Hiroshi Matsui; Takanori Suzuki, all of Mie, Japan

[73] Assignee: Yuka Badische Co., Ltd., Yokkaichi, Japan

[21] Appl. No.: 640,811

[22] Filed: Aug. 15, 1984

[30] Foreign Application Priority Data

Aug. 26, 1983 [JP] Japan .................. 58-156056

[51] Int. Cl.$^4$ .................................. C08J 9/22
[52] U.S. Cl. ........................ 521/58; 521/56; 521/60
[58] Field of Search ...................... 521/56, 58, 60

[56] References Cited

U.S. PATENT DOCUMENTS

| | | | |
|---|---|---|---|
| 4,399,087 | 8/1983 | Akiyama et al. | 521/60 |
| 4,436,840 | 3/1984 | Akiyama et al. | 521/60 |
| 4,448,901 | 5/1984 | Senda et al. | 521/58 |
| 4,464,484 | 8/1984 | Yoshimura et al. | 521/60 |

Primary Examiner—Morton Foelak
Attorney, Agent, or Firm—Oblon, Fisher, Spivak, McClelland & Maier

[57] ABSTRACT

A process for producing foamed particles of a polyolefin resin which comprises dispersing polyolefin resin particles in water in a closed vessel, feeding a volatile blowing agent into the closed vessel, heating the dispersion to a temperature above the softening point of the polyolefin resin particles but below their melting point, opening a discharge port provided within the closed vessel below the water surface and releasing the aqueous dispersion containing the polyolefin resin particles impregnated with the blowing agent into an atmosphere kept at a lower pressure than the pressure within the closed vessel; wherein (i) when the last portion of the aqueous dispersion containing the polyolefin resin particles impregnated with the blowing agent is released from the closed vessel, the pressure within the closed vessel is at least 5 kg/cm$^2$.G, and (ii) in order to maintain the pressure within the closed vessel at the time of releasing the last portion of the aqueous dispersion from the closed vessel at at least 5 kg/cm$^2$.G, a pressurized inorganic gas is introduced into the closed vessel before the heating of the aqueous dispersion is started, provided that the inorganic gas is not freshly supplied to the closed vessel after starting the releasing of the aqueous dispersion.

7 Claims, 2 Drawing Figures

PROCESS FOR PRODUCING FOAMED PARTICLES OF POLYOLEFIN RESIN

FIELD OF THE INVENTION

This invention relates to a process for producing foamed particles of a polyolefin resin. A foamed product obtained by filling the foamed particles produced by the process of this invention in the cavity of a mold having steam holes and heating them by steam to melt-adhere the particles each another has firm bondage between the particles and excellent mechanical strength, and is useful as a heat insulating material for pipe of hot spring, a heat insulating material for solar heaters, and a packaging and cushioning material for refrigerators and television sets. Since the process of this invention can give foamed particles even under considerably low pressures, it has the advantage that the ability of the compressor and the pressure resistance of a closed vessel (autoclave) can be low.

BACKGROUND OF THE INVENTION

Polystyrene foams have found wide applications because of their excellent performance as a heat insulating material and a packaging and cushioning material. However, they have a low recovery of compression strain and can withstand heat at a temperature of 70° to 80° C. at the highest. These defects may be eliminated by using polypropylene foams or cross-linked polyethylene foams. Since, however, blowing agents used for polyolefin resins have a fast speed of dissipation, it is difficult to produce foamed particles suitable as a starting material for polyolefin foams. Any foamed particles that can be obtained has a low expansion ratio with a bulk density of 0.1 to 0.5 $g/cm^3$ at the highest.

In an attempt to solve this problem, a process for producing high-expansion polypropylene foamed particles having a bulk density of 0.05 to 0.07 $g/cm^3$ was proposed, which comprises dispersing polypropylene resin particles in a dispersing medium such as water in a closed vessel, maintaining the dispersion at a high pressure above the saturated vapor pressure of the dispersion and a temperature above the softening point of the polypropylene to penetrate the dispersing medium into the polypropylene resin particles, and then jetting the dispersion from the inside of the closed vessel under high pressure into the atmosphere as described in Japanese Patent Publication No. 2183/1974 which corresponds to U.S. Pat. No. 3,770,663.

According to the process of this Japanese patent document, water as the dispersing medium is utilized as a blowing agent, and high-expansion products having a bulk density of 0.016 to 0.04 $g/cm^3$ as is the case with polystyrene foamed particles are not obtained. Attempts have been made to remedy the defect of this process by using a combination of water and a volatile organic blowing agent as a blowing agent. A process for producing polyolefin resin foamed particles which comprises dispersing polyolefin resin particles in water in a closed vessel, feeding a blowing agent into the closed vessel, heating the dispersion to a temperature above the softening point of the polyolefin resin particles but below their melting point while maintaining the pressure within the closed vessel at the vapor pressure of the blowing agent or a higher pressure, opening a discharge port provided within the sealed vessel below the water surface, and releasing the aqueous dispersion containing the polyolefin resin particles impregnated with the blowing agent into an atmosphere kept at a lower pressure than the pressure within the closed vessel has been proposed as described in Japanese Patent Application (OPI) Nos. 12035/1982, 25336/1982, 90027/1982, 195131/1982, 1732/1983, 23834/1983, 25334/1983, 33435/1983, 55231/1983, 76229/1983, 76231/1983, 76232/1983, 76233/1983, 76234/1983 and 87027/1983 (the term "OPI" as used herein refers to a "published unexamined Japanese patent application").

This process can give foamed products of polypropylene resin having a bulk density of 0.026 to 0.60 $g/cm^3$. Furthermore, it is described therein that this process can also be applied to polyethylene resins and cross-linked polyethylene resins instead of propylene copolymer resins.

A process in which in order to obtain foamed resin particles having a uniform cell diameter, a back pressure is applied by feeding an inorganic gas such as air or nitrogen gas by means of a compressor even during the releasing of the aqueous dispersion in order to maintain $P_1$ (the pressure within the vessel after the releasing of the dispersion) at a constant value which is at least $0.7 P_0$ in which $P_0$ is the pressure of the dispersion before releasing from the closed vessel has been proposed as described in Japanese Patent Application (OPI) No. 55231/1983 corresponding to EP 84,803. In this process $P_0$ is 15 to 40 $kg/cm^2.G$. The compressor must be operated even during the releasing of the dispersion in order to feed a gas such as nitrogen gas. To maintain $P_1$ at a pressure of 10 to 28 $kg/cm^2.G$, for example, the compressor must have a considerably high capacity. Hence, the cost of equipment and the cost of the product become high.

SUMMARY OF THE INVENTION

An object of this invention is to provide a process for producing polyolefin resin foamed particles, which is free from the aforesaid defects of the prior art.

The process for producing foamed particles of a polyolefin resin according to this invention comprises dispersing polyolefin resin particles in water in a closed vessel, feeding a volatile blowing agent into the closed vessel, heating the dispersion to a temperature above the softening point of the polyolefin resin particles but below their melting point according to the microscope measurement (i.e., the temperature at which the crystals dissolve and the resin becomes transparent), opening a discharge port provided within the closed vessel below the water surface and releasing the aqueous dispersion containing the polyolefin resin particles impregnated with the blowing agent into an atmosphere kept at a lower pressure than the pressure within the closed vessel; wherein (i) when the last portion of the aqueous dispersion containing the polyolefin resin particles impregnated with the blowing agent is released from the closed vessel, the pressure within the closed vessel is at least 5 $kg/cm^2.G$, and (ii) in order to maintain the pressure within the closed vessel at the time of releasing the last portion of the aqueous dispersion from the closed vessel at at least 5 $kgc/cm^2.G$, a pressurized inorganic gas is introduced into the closed vessel before the heating of the aqueous dispersion is started, provided that the inorganic gas is not freshly supplied to the closed vessel after starting the releasing of the aqueous dispersion.

BRIEF DESCRIPTION OF THE ACCOMPANYING DRAWINGS

DETAILED DESCRIPTION OF THE INVENTION

Figure 2:
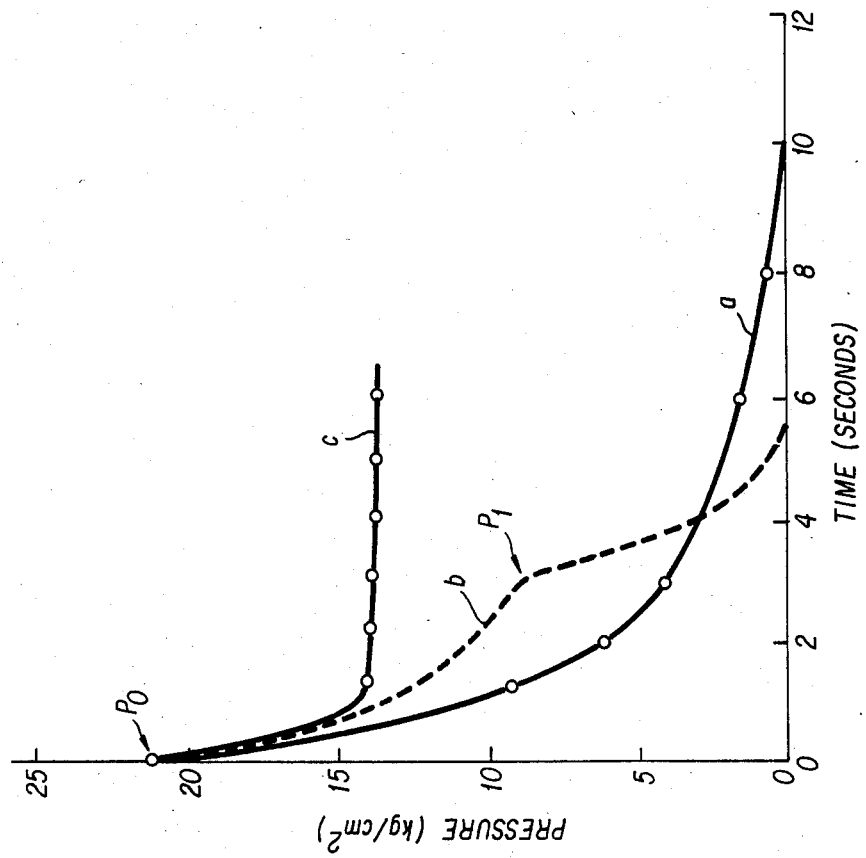
FIG. 2 is a graph showing changes of the pressure of the inside of an autoclave with the passage of time.

The polyolefin resin particles to be dispersed in water in the present invention include, for example, particles of polyethylene, polypropylene, ethylene/ propylene copolymer, ethylene/propylene/butene-1 copolymer, ethylene/vinyl acetate copolymer, silane-modified polypropylene, and cross-linked products of these polymers.

The weight of these resin particles is 0.01 to 20 mg. These resin particles may contain inorganic fillers (e.g., talc, clay, diatomaceous earth, calcium carbonate, titanium oxide, barium sulfate and zeolites), stabilizers, ultraviolet absorbers, etc.

The volatile blowing agent may be an organic compound having a boiling point of not more than 80° C. Examples thereof include aliphatic hydrocarbons such as propane, butane, pentane, hexane and heptane and halogenated hydrocarbons such as trichlorofluoromethane, dichlorodifluoromethane, dichlorotetrafluoroethane, methyl chloride, ethyl chloride, and methylene chloride. The blowing agent may be used alone or in combination.

The amount of the volatile blowing agent added, which differs depending upon the kind of the blowing agent and the desired expansion ratio of the polyolefin resin particles, is usually 10 to 50 parts by weight per 100 parts by weight of the polyolefin resin particles.

A dispersing agent is used to disperse the polyolefin resin particles in water. Examples of the dispersing agent are inorganic suspending agents such as aluminum oxide, titanium oxide, calcium carbonate, basic magnesium carbonate and tertiary calcium phosphate; water-soluble polymeric protective colloids such as polyvinyl alcohol, methyl carboxy cellulose and N-polyvinylpyrrolidone; anionic surface active agents such as sodium dodecylbenzenesulfonate, sodium alkanesulfonates, sodium salts of alkylsulfates, sodium salts of olefin sulfates, acylmethyltaurines, and sodium dialkylsulfosuccinates. It is preferred to use a combination of tertiary calcium phosphate having a particle diameter of 0.01 to 0.8 micron which is an inorganic suspending agent most effective for preventing blocking of the resin particles and a suspending aid such as sodium dodecylbenzenesulfonate. This fine tertiary calcium phosphate can be obtained by reacting 1 mol of calcium hydroxide with 0.60 to 0.67 mol of phosphoric acid (see Japanese Patent Application No. 154284/1983). An aqueous solution containing this difficultly water-soluble salt has a pH of 8.5 to 11.5. This aqueous solution contains tertiary calcium phosphate $[Ca_3(PO_4)_2]$ having an average particle diameter of 0.01 to 0.8 micron as a main component and sometimes contains hydroxyapatite $[Ca_3(PO_4)_3\cdot Ca(OH)_2]$. If the amount of phosphoric acid used exceeds 0.67 mol per mol of calcium hydroxide and the aqueous solution containing this difficultly water-soluble tertiary calcium phosphate is used as a dispersing medium for the polyolefin resin particles, tertiary calcium phosphate changes to crystalline hydroxyapatite at a high temperature of 90° to 100° C. With this change, the pH of the dispersing medium falls below 5 and its ability to disperse the polyolefin resin particles is reduced.

On the other hand, if the amount of phosphoric acid used is less than 0.60 mol, a calcium ion increases in the dispersing medium and the alkali metal ion of the anionic surface active agent is replaced by the calcium ion. Consequently, the surface active agent sediments and its function as a suspending aid is reduced, and blocking tends to occur in the heated polyolefin resin particles.

The aqueous solution containing the difficultly water-soluble tertiary calcium phosphate can be utilized as a dispersing medium for the polyolefin resin particles by adjusting the concentration of this difficultly water-soluble salt to 0.01 to 0.3% by weight. If the concentration is less than 0.01% by weight, blocking of the polyolefin resin particles tends to occur. If it exceeds 0.3% by weight, the melt-adhesion of the foamed particles is reduced. A water-soluble medium such as methanol, ethanol, glycerol and ethylene glycol may be incorporated in water used as the dispersing medium.

The surface active agent as a suspending aid is used in a proportion of 0.0001 to 0.005% by weight based on the weight of water as the dispersing medium. If the proportion is less than 0.0001% by weight, blocking of the polyolefin resin particles under heat and pressure tends to occur. If it exceeds 0.005% by weight, no further improvement in antiblocking effect can be obtained, and it is economically disadvantageous.

Examples of the suspending aid are anionic surface active agents such as sodium dodecylbenzenesulfonate, sodium alkanesulfonates, sodium salts of alkylsulfates, sodium salts of olefin sulfates, acylmethyltaurines, and sodium dialkylsulfosuccinates; nonionic surface active agents such as polyoxyethylene alkyl ethers, polyoxyethylene fatty acid esters, polyoxyethylene alkyl phenol ethers, sorbitan fatty acid esters and polyoxyethylene sorbitan fatty acid esters; and amphoteric surface active agents such as alkylbetaines and alkyldiethylenetriaminoacetic acid.

The amount of water as the dispersing medium is 200 to 1,000 parts by weight, preferably 250 to 500 parts by weight, per 100 parts by weight of the polyolefin resin particles. If it is less than 200 parts by weight, blocking of the polyolefin resin particles tends to occur during heating under pressure. If it exceeds 1,000 parts by weight, the productivity of the polyolefin resin foamed particles is reduced and it is not economical.

The blowing agent in a gaseous or liquid form is fed into the aqueous dispersion of the polyolefin resin particles, and the aqueous dispersion is heated within the closed vessel to a temperature above the softening point of the polyolefin resin but below its melting point (according to the microscope measurement). By this heating, the pressure of the inside of the vessel becomes the vapor pressures of water as the dispersing medium and the blowing agent or higher. Subsequently, the polyolefin resin particles together with water are released from a discharge port such as a slit or nozzle provided in the lower portion of the closed vessel into a zone kept at a lower pressure than in the closed vessel (generally kept at atmospheric pressure). As a result, polyolefin resin foamed particles having a bulk density of 0.012 to 0.2 g/cm$^3$ can be produced.

In order to achieve the characteristic features (i) and (ii) of the process of this invention, an inorganic gas (12) such as nitrogen, helium or air is fed into the closed vessel (1) before or after the addition of the blowing agent (6) to the closed vessel (1), thereby applying pressure. The feeding of the inorganic gas may be effected before or after the heating of the dispersion. Immediately before the releasing of the aqueous dispersion from the discharge port (7) begins, the valve is closed, and thereafter the inorganic gas is not supplied. The pressure $P_1$ at the time when the final portion of the aqueous dispersion is released from the closed vessel (1) is at least 5 kg/cm$^2$.G, preferably at least 10 kg/cm$^2$.G By maintaining this pressure, foamed particles having a uniform cell diameter can be obtained. The pressure P is determined by using the following equation as a criterion.

$$P_1 = P_0 \times (1 - F/100)$$

wherein
- $P_0$: the pressure of the inside of the closed vessel when the aqueous dispersion is first released from the closed vessel,
- $P_1$: the pressure of the inside of the closed vessel when the final portion of the aqueous dispersion is released from the closed vessel,
- F: the initial ratio (%) of filling of the volume within the closed vessel by the aqueous dispersion of the polyolefin resin particles in the closed vessel.

When, for example, $P_0$ is 22 kg/cm$^2$.G and the ratio of filling of the aqueous dispersion is 60%, $P_1$ is 8.8 kg/cm$^2$.G. As the values of $P_1$ and $P_0$ become higher, the cell diameter of the foam becomes finer. The closed vessel (1) is maintained at a temperature above a certain point during the releasing of the aqueous dispersion so that $P_1$ is maintained at 5 kg/cm$^2$.G or higher.

As shown by the curve b in FIG. 2, when the valve (8) is opened and the polyolefin resin particles (2) and water (3) begin to be released into the atmosphere from the closed vessel, the pressure of the inside of the closed vessel gradually decreases from 22 kg/cm$^2$.G ($P_0$), and the pressure $P_1$ at the time when the final portion of the aqueous dispersion is released from the closed vessel (1) becomes considerably lower. The pressure $P_1$ is due to the pressurized inorganic gas introduced into a 50 liter closed vessel and the blowing agent and steam remaining in the vapor portion. Thereafter, the pressurized inorganic gas and the remaining blowing agent and steam escape into the atmosphere from the closed vessel through a pipe 7, and finally, the pressure of the inside of the closed vessel (1) becomes 0 kg/cm$^2$.G.

The curve a of FIG. 2 is a pressure curve obtained when the dispersion is released while being stirred by a stirring vane (10). When the stirring is stopped before the releasing of the aqueous dispersion and then the aqueous dispersion is released from the closed vessel, the pressure curve becomes b in FIG. 2. In the case of the curve a of FIG. 2, the stirring is continued during the releasing of the aqueous dispersion. Therefore, the aqueous dispersion and a part of the vapor phase are simultaneously released, and the pressure drop is fast. The pressure at the time of releasing the final portion of the aqueous dispersion becomes smaller than the calculated value and is sometimes below 5 kg/cm$^2$.G. This is undesirable. In the case of the curve b of FIG. 2, the stirring is stopped, and the vapor portion is not released during the releasing of the aqueous dispersion. Thus, the pressure drop is in accordance with the calculating formula. If a back pressure is applied by air (9) or the like even during the releasing of the aqueous dispersion as in Japanese Patent Application (OPI) No. 55231/1983, the pressure curve is as shown in c of FIG. 2, and the time of operating the compressor becomes correspondingly longer.

Feeding of an inorganic gas such as air, nitrogen gas, or argon into the closed vessel makes it easy to impregnate the blowing agent into the polyolefin resin particles and serves to produce polyolefin resin foamed particles having fine cells.

The temperature of heating the dispersion may be set between the melting point of the polyolefin resin particles and a temperature about 10° C. lower than the melting point, preferably 3° to 7° C. lower than the melting point. For example, in the case of a homopolymer of propylene having a melting point of 164° C., the heating temperature is set at 154° to 164° C. Furthermore, the heating temperature is set at 125° to 135° C. for propylene/ethylene/butene-1 copolymer having a melting point of 135° C., and at 109°–119° C. for an ethylene homopolymer having a melting point of 119° C.

The heating time is 20 to 90 minutes, preferably 30 to 60 minutes. During the heating, the aqueous dispersion in the closed vessel is stirred to prevent blocking of the softened polyolefin resin particles.

By the heating and pressurizing of the aqueous dispersion in the closed vessel, the blowing agent is impregnated into the polyolefin resin particles to impart foamability to the resin particles.

Figure 1:
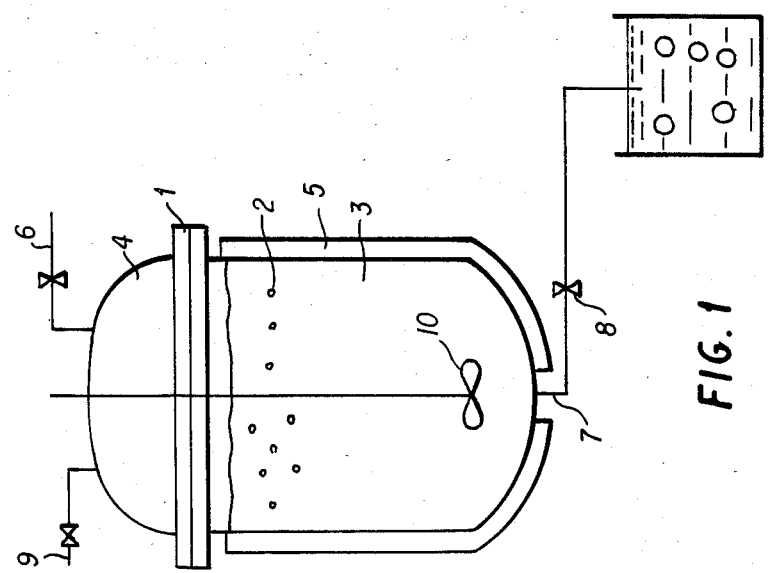
FIG. 1 is a view for illustrating one embodiment of the present invention.

As shown in FIG. 1, the polyolefin resin particles containing the blowing agent are foamed by being released into a lower pressure zone (specifically, into the atmosphere) together with water (3) from the nozzle (7) of the closed vessel (1). As a result, foamed particles having a bulk density of 0.012 to 0.2 g/cm$^3$ result. The particle diameter and bulk density of the resulting foamed particles depend upon the particle diameter of the starting polyolefin resin particles, the heating temperature, the pressure on the dispersion, etc.

The resulting foamed particles are aged in a chamber at 30° to 65° C. in order to remove water, and subjected to molding to form a cushioning material, containers, etc.

Various known methods of molding can be utilized. Some of such methods are:

(1) A method which comprises excessively filling the polyolefin resin foamed particles in a mold, compressing them to reduce the volume of the foamed particles by 15 to 50%, introducing steam under 1 to 5 kg/cm$^2$.G to melt-adhere the foamed particles to one another, and then cooling the mold to form a final product;

(2) A method which comprises impregnating the foamed particles with a volatile blowing agent to impart secondary foamability to them, filling the foamed particles in a mold, and molding them with steam;

(3) A method which comprises putting the foamed particles in a closed chamber, introducing an inorganic gas such as air or nitrogen gas under pressure into the chamber to increase the pressure of the foamed particles within the cells and thus impart secondary foamability, filling the foamed particles in a mold, and molding them with steam; and (4) Combinations of two or more of the methods (1), (2) and (3).

The polyolefin resin foamed products so obtained have excellent melt-adhesion among the particles and high mechanical strength.

The following examples illustrate the present invention in greater details. All parts and percentages in these examples are by weight.

EXAMPLE 1

An autoclave was charged with 250 parts of water, 100 parts of particles of ethylene (4%) propylene random copolymer (melting point 140° C.), 0.7 part of tertiary calcium phosphate having a particle diameter of 0.3 to 0.5 micron and 0.07 part of sodium dodecylbenzenesulfonate (filling ratio 45%), and then with stirring, nitrogen gas was introduced into the autoclave until the pressure of the inside of the autoclave became 5 kg/cm$^2$.G. The feeding of the nitrogen gas was stopped. Then, 21 parts of isobutane was fed into the closed autoclave, and the temperature was raised to 135° C. over 1 hour. The mixture was maintained at this temperature for 30 minutes, whereupon the pressure of the inside of the autoclave became 23 kg/cm$^2$.G.

The valve (8) of the discharge nozzle (7) at the bottom of the autoclave (1) was opened, and the dispersion was released into the atmosphere for about 2 seconds to perform foaming. The pressure of the inside of the autoclave was about 12.7 kg/cm$^2$.G the moment that final portion of the dispersion was released from the autoclave. During the releasing of the dispersion, the temperature of the autoclave was maintained at 135° C.

The resulting polypropylene foamed particles had a bulk density of about 27 g/liter, and no blocking of the foamed particles was observed.

The foamed particles were left to stand in a chamber at 40° C. for 2 days to remove moisture. Then, the foamed particles were put in a closed chamber and air under 3 kg/cm$^2$.G was introduced into the chamber for 48 hours to impart secondary foamability to the particles.

The foamed particles having secondary foamability were filled in a mold cavity having steam holes. Steam under 4.5 kg/cm$^2$.G was introduced into the mold cavity to perform secondary foaming and melt-adhere the foamed particles to each one another. The mold cavity was then cooled to give a polypropylene foamed product having a bulk density of about 28 g/liter, a length of 200 mm, a width of 300 mm and a height of 50 mm.

EXAMPLES 2 TO 10 AND COMPARATIVE EXAMPLES 1 TO 4

In each example, foamed particles as shown in Table 1 were produced in the same way as in Example 1 except that the kind of the polyolefin resin particles, the filling ratio, the pressure applied by nitrogen gas, the amount of isobutane added, and the temperature of heating the aqueous dispersion were changed as shown in Table 1.

In Table 1, the polyolefin resin particles shown by abbreviations have the following meanings.

FX 4: "Mitsubishi Noblene FX 4", a trade name for ethylene/propylene copolymer manufactured by Mitsubishi Petrochemical Co., Ltd.)

EX 6: "Mitsubishi Noblene EX 6", a trade name for ethylene/propylene copolymer manufactured by Mitsubishi Petrochemical Co., Ltd.

SPX 4400: a trade name for ethylene/propylene/butene copolymer manufactured by Mitsubishi Petrochemical Co., Ltd.

SPX 9800: a trade name for ethylene/propylene copolymer manufactured by Mitsubishi Petrochemical Co., Ltd.

X-1B: "Mitsubishi Noblene X-1B", a trade name for a ternary blend polymer of polypropylene, low density polyethylene and ethylene/propylene rubber manufactured by Mitsubishi Petrochemical Co., Ltd.

HE 60: "Yukalon HE 60", a trade name for ethylene/vinyl acetate copolymer manufactured by Mitsubishi Petrochemical Co., Ltd.

TABLE 1

| | Resin Particles | | F Filling Ratio (%) | N$_2$ Pressurized (kg/cm$^2$G) | Blowing Agent | | Autoclave Temperature (°C.) | Pressure of the Closed Vessel (kg/cm$^2$G) | | Foamed Particles | | |
|---|---|---|---|---|---|---|---|---|---|---|---|---|
| | Kind | DSC Fusion Peak Temperature | | | Kind | Amount (parts) | | P$_0$ | P$_1$ | Bulk Density (g/l) | Cell Size (mm) | Characteristics* |
| Example | | | | | | | | | | | | |
| 1 | FX 4 | 140 | 45 | 5 | Isobutane | 21 | 135 | 23 | 12.65 | 27 | 0.09 | o |
| 2 | " | " | 70 | 10 | " | 15 | 135 | 37 | 11.1 | 26 | 0.06 | o |
| 3 | " | " | 80 | 10 | " | 13 | 135 | 40 | 8 | 23 | 0.06 | o |
| 4 | " | " | 80 | 5 | " | 13 | 135 | 30 | 6 | 25 | 0.12 | Δ |
| 5 | EX 6 | 142 | 60 | 5 | " | 20 | 135 | 26 | 10.4 | 22 | 0.09 | o |
| 6 | EX 6 | " | 60 | 5 | " | 22 | 135 | 30 | 12 | 14 | 0.15 | o |
| 7 | SPX 4400 | 130 | 60 | 5 | " | 20 | 123 | 22 | 8.8 | 18 | 0.20 | o |
| 8 | SPX 9800 | 145 | 60 | 5 | " | 20 | 140 | 28 | 11.2 | 22 | 0.15 | o |
| 9 | X-1B | 160 | 60 | 5 | " | 20 | 153 | 30 | 12 | 14 | 0.05 | o |
| 10 | HE 60 | 103 | 60 | 5 | " | 20 | 97 | 18 | 7.2 | 19 | 0.05 | o |
| Comp. Ex. | | | | | | | | | | | | |
| 1 | FX 4 | 140 | 80 | 0 | " | 13 | 135 | 20 | 4 | 29 | 0.25 | x |
| 2 | " | " | 60 | 0 | Pentane | 20 | 135 | 10 | 4 | 25 | 0.30 | x |
| 3 | " | " | 60 | 5 | Isobutane | 20 | 125 | 23 | 9.2 | were not foamed | — | x |
| 4 | " | " | 60 | 5 | " | 20 | 142 | 28 | 11.2 | 20 | above 1.0 | x |

*Characteristics:
o: Granular, uniform
Δ: Some cells are coarse and large.
x: The foamed particles shrank and large amounts of large and coarse cells formed.

While the invention has been described in detail and with reference to specific embodiments thereof, it will be apparent to one skilled in the art that various changes and modifications can be made therein without departing from the spirit and scope thereof. What is claimed is:

1. A process for producing foamed particles of a polyolefin resin which comprises dispersing polyolefin resin particles in water in a closed vessel provided with a discharge port that is initially closed, the water surface in the closed vessel being above the level of the discharge port, feeding a voltatile organic blowing agent into the closed vessel, heating the aqueous dispersion so produced to a temperature above the softening point of the polyolefin resin paritlces but below their melting point, thereby impregnating the polyolefin resin particles with the blowing agent, to produce impregnated polyolefin resin particles, establishing a pressure within the closed vessel which is above that of the atmosphere into which the dispersion is to be discharged, opening the discharge port thereby releasing the aqueous dispersion containing the impregnated polyolefin resin particles into said atmosphere kept at a lower pressure than the pressure within the closed vessel, while permitting the pressure within the closed vessel to drop due to the release of said aqueous dispersion; wherein (i) when the last portion of the aqueous dispersion containing the polyolefin resin particles impregnated with the blowing agent is released from the closed vessel, the pressure within the closed vessel is at least 5 kg/cm$^2$.G, and (ii) in order to maintain the pressure within the closed vessel at the time of releasing the last portion of the aqueous dispersion from the closed vessel at at least 5 kg/cm$^2$.G, a pressurized inorganic gas is introduced into the closed vessel to apply higher pressure before or after the heating of the aqueous dispersion is started, but prior to releasing of the aqueous dispersion, provided that additional iorganic gas is not supplied to the closed vessel after starting the releasing of the aqueous dispersion.

2. The process of claim 1, wherein the releasing of the aqueous dispersion is carried out so as to satisfy the following equation $$P_1 = P_0 \times (1 - F/100)$$

wherein
$P_0$: the pressure of the inside of the closed vessel when the aqueous dispersion is first released from the closed vessel,
$P_1$: the pressure of the inside of the closed vessel when the final portion of the aqueous dispersion is released from the closed vessel, and
F: the initial ratio (%) of filling of the volume within the closed vessel by the aqueous dispersion of the polyolefin resin particles in the closed vessel.

3. The process of claim 1, wherein the polyolefin resin particles are dispersed in water by the aid of a mixture of tertiary calcium phosphate having a particle diameter of 0.01 to 0.8 micron and sodium dodecylbenzenesulfonate.

4. The process of claim 1, wherein the tertiary calcium phosphate is obtained by reacting 1 mol of calcium hydroxide with 0.60 to 0.67 mol of phosphoric acid.

5. The process of claim 2, wherein a stirrer is provided within the closed vessel and said stirrer is operated only when the discharge port is closed.

6. The process according to claim 2 wherein the amount water as the dispersing medium is 200 to 1,000 parts by weight per 100 parts by weight of the polyolefin resin particles and the volatile organic blowing agent has a boiling point of not more than 80° C.

7. The process according to claim 6 wherein the inorganic gas is fed into the closed vessel at a pressure below $P_o$ and before the vessel is heated, and not after the vessel has been heated to establish the pressure $P_o$.

* * * * *